Patented June 12, 1951

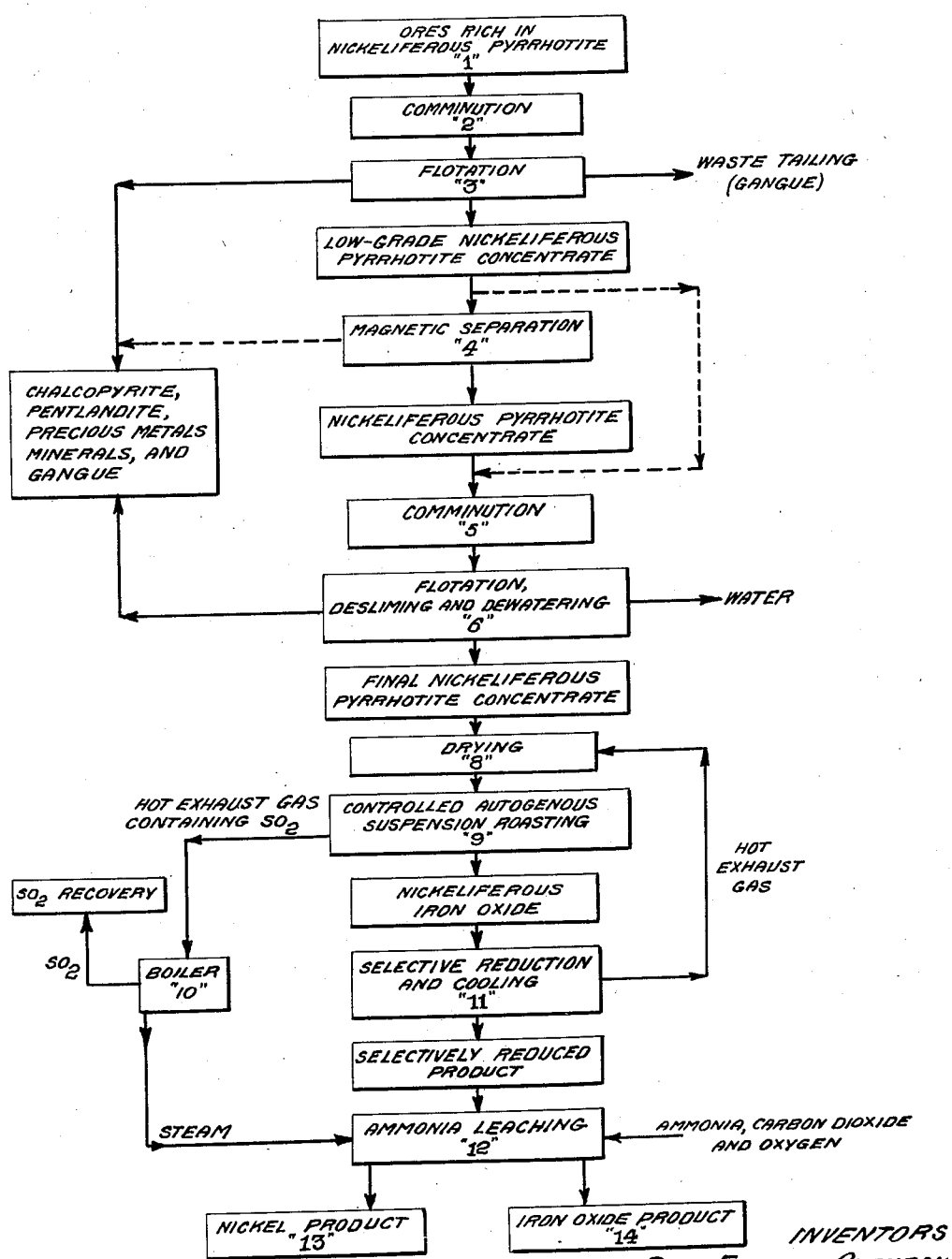

2,556,215

UNITED STATES PATENT OFFICE 2,556,215

METHOD OF PRODUCING HIGH-GRADE IRON OXIDE FROM ORES RICH IN NICKELIFEROUS PYRRHOTITE

Paul Etienne Queneau, Westport, Conn., and William Kelvin Sproule and Alexander Illis, Copper Cliff, Ontario, Canada, assignors to The International Nickel Company, Inc., New York, N. Y., a corporation of Delaware Application March 5, 1949, Serial No. 79,814
In Canada April 1, 1948

9 Claims. (Cl. 23—200)

The present invention relates generally to a process for treating ores rich in nickeliferous pyrrhotite and containing other metals including copper and precious metals, and, more particularly, to an improved method of producing high-grade iron oxide from such ores.

Ores of the type contemplated for treatment by the present process have been treated, heretofore, almost entirely by methods involving smelting, whereby the iron content is rejected in a waste slag which also has a nickel content. Many attempts have been made in the past to economically produce iron from ores rich in nickeliferous pyrrhotite and also containing copper and precious metals, such as the platinum-group metals and gold. Such attempts have included roasting of the sulfides and reduction of the resulting oxides to metal. In connection with the various prior art attempts, magnetic concentration of the pyrrhotite into a concentrate relatively low in copper and nickel prior to roasting and reducing the oxide has also been proposed. Still other proposals have involved selective flotation, chloridizing, or sulfatizing roasting, various leaching procedures, etc. None of these attempts have proved successful since the nickel, copper, sulfur or precious metals could not satisfactorily and econmically be removed from the material during treatment, and the residual iron product contained undesired amounts of these constituents. The relatively high nickel and copper contents of nickeliferous pyrrhotite concentrates obtained by methods known to the art is a main reason why attempts to produce an iron oxide product without leaching have been unsuccessful and unacceptable for the production of iron and steel. Furthermore, iron sulfide concentrates produced by prior art methods from average Sudbury ore have contained a sufficient amount of precious metals to considerably handicap attempts to produce economically a high-grade iron oxide eminently desirable for iron and steel production. M. H. Caron, in his pioneer work on the treatment of lateritic nickel ores, noted that nickel-containing arsenide and sulfide ores could be roasted to the oxide form, then similarly selectively reduced and leached in ammoniacal solutions for nickel recovery. Even in the case of processes involving reduction, chloridizing, or sulfating, followed by leaching, the residual copper, nickel, sulfur or precious-metal contents of the final iron oxide product have been sufficiently high to render such processes commercially unattractive. As far as is known, no commercially satisfactory process has been provided for production of the aforesaid high-grade iron oxide product.

It is an object of the present invention to provide a novel combination of operations for treating ores rich in nickeliferous pyrrhotite to produce high-grade iron oxide substantially uncontaminated by copper, nickel and precious metals and very suitable for iron and steel production, and concomitantly to produce copper-rich and nickel-rich by-products.

It is another object of the present invention to provide a process for treating ores rich in nickeliferous pyrrhotite and containing copper and sometimes precious metals for the recovery of the valuable contained metals as commercial products.

Other objects and advantages of the present invention will become apparent from the following description taken in conjunction with the accompanying drawing, which illustrates a flowsheet embodying the novel combination of operations comprising the present process by which a nickeliferous-pyrrhotite concentrate is obtained from a copper-nickel sulfide ore which may also contain precious metals and from which concentrate on iron oxide product and a nickel product suitable for industrial use can be produced.

An improved process has been discovered which involves a novel combination of ore dressing, pyrometallurgical and leaching operations in which a high-grade iron oxide, excellent for use in conventional iron and steel production, is produced while at the same time nickel, copper and precious-metal values are economically recovered as high-grade products from sulfide ores containing nickeliferous pyrrhotite.

The raw material contemplated for treatment by the present novel process is ore containing an important proportion of nickeliferous pyrrhotite, for example, ores of the Sudbury type. Such ores comprise mainly pyrrhotite, pentlandite, chalcopyrite, together with varying amounts of precious-metal minerals and siliceous gangue. The pyrrhotite fraction contains small amounts of nickel, e. g., less than about 1% nickel by weight, as a submicroscopic dispersion or solid solution which is not mechanically separable from the pyrrhotite.

Broadly stated, the novel combination of operations comprises first subjecting the finely-divided ore, consisting mainly of nickeliferous pyrrhotite, pentlandite, chalcopyrite, precious-metal minerals and siliceous gangue, to a series of flotation and desliming operations, with or without magnetic separation, to produce a clean nickeliferous-pyrrhotite concentrate and one or more high-grade concentrates containing the copper and precious metals and the balance of the nickel. These latter concentrates can be treated for the recovery of their contained metals by methods well known in the art. The nickeliferous-pyrrhotite concentrate is roasted under controlled conditions, preferably in a furnace of the injection-suspension or the fluid-bed type, to obtain a low-sulfur calcine. The calcine from the roasting operation is selectively reduced, preferably in a rotary kiln or in a furnace of the fluid-bed type, under controlled conditions of temperature, atmosphere and time, to obtain a selective reduction of the nickel in the calcine to a condition substantially all soluble in ammoniacal leaching solutions while at the same time maintaining the iron in the calcine in a condition substantially all insoluble in said ammoniacal solutions.

More particularly, the present process relates to the treatment of ores, such as those of the Sudbury type, containing up to about 10% pentlandite, e. g., about 1% to about 5% pentlandite; up to about 10% chalcopyrite, e. g., about 1% to about 5% chalcopyrite; a small amount of precious metals; e. g., less than about 0.05 ounce of precious metals per ton, up to about 65% pyrrhotite, e. g., about 10% to about 35% pyrrhotite, containing less than about 1% of nickel; and the balance mainly siliceous gangue. The ore is comminuted to a particle size whereby about 2% to about 20% is retained on a 65 mesh screen. The ground ore is then treated by flotation to separate the greater part of the chalcopyrite, pentlandite, and precious metals-containing minerals from the nickeliferous pyrrhotite and gangue fractions. The pyrrhotite-bearing fraction is then subjected to flotation to separate the nickeliferous pyrrhotite and the remaining chalcopyrite and pentlandite from the siliceous gangue. The pyrrhotite-bearing fraction, particularly if non-magnetic pyrrhotite is absent, or present in only small proportion, can also be subjected to magnetic concentration in conjunction with the aforementioned flotation operations to aid in separating magnetic pyrrhotite from chalcopyrite, pentlandite, precious-metal minerals and gangue. The pyrrhotite concentrate obtained by the foregoing operations still contains an undesirably high percentage of minerals containing copper, nickel, precious metals and gangue as mixed grains in the coarsest size fractions of the concentrate, and the proportion of gangue in the finest size fraction, i. e., the slime portion, is high. The pyrrhotite concentrate produced by the foregoing operations is then given a further grind to obtain a particle size of at least about 75% finer than 200 mesh. This second grinding operation obtains further liberation of the pyrrhotite from the other minerals and, upon subsequently treating by another flotation operation in conjunction with desliming operations, substantially all of the remaining chalcopyrite, pentlandite, precious metals-containing minerals and gangue are separated from pyrrhotite to yield a final nickeliferous-pyrrhotite product containing less than about 6% siliceous gangue, less than about 0.90% nickel, less than about 0.05% copper and less than 0.01 ounce of platinum-group metals and gold per ton. The foregoing composition ranges of cleaned nickeliferous pyrrhotite are those which can be readily obtained when treating a typical Sudbury ore. For instance, in test operations, a cleaned nickeliferous pyrrhotite concentrate, analysing 0.80% nickel, 0.03% copper, 2.5% silica and 0.005 ounce per ton of precious metals, has been obtained.

In the foregoing final flotation separation of the chalcopyrite, pentlandite, and precious metals-containing minerals from the nickeliferous pyrrhotite, good results are obtained by the use of a strong collector at high pH, for example, amyl xanthate at about pH 11 in e. g. a lime circuit. As is well known in the art, copper sulfate can be employed as an activating agent for pyrrhotite to aid in its separation from gangue by flotation. The purity of the pyrrhotite concentrate is substantially improved with respect to obtaining low siliceous gangue and copper contents by de-sliming treatments in which siliceous gangue and copper-rich minerals are separated from the pyrrhotite by virtue of their finer particle size and their lesser tendency to flocculate and settle in aqueous suspension.

The specific operational details of the ore-dressing operations are, as those skilled in the art understand, dependent upon the exact nature of the ore being treated. The foregoing description of the concentration procedure is suitable for several types of Sudbury ores.

The clean nickeliferous-pyrrhotite concentrate is dried to less than about 0.5% moisture content and then roasted to less than about 0.5% sulfide-sulfur content. Any type of roasting equipment which permits satisfactory sulfur removal and which permits close control of the temperature may be employed, including multiple-hearth roasters of the mechanical type and rotary kilns. For instance, we have carried out test operations demonstrating that hearth roasting can be conducted so as to obtain a low sulfide-sulfur content. However, it is much preferred to oxidize the pyrrhotite concentrate by autogenous injection-suspension or fluid-bed roasting. These preferred methods offer marked advantages from the viewpoints of both metallurgy and economy. Autogenous injection-suspension or fluid-bed roasting are preferred methods of roasting in that, under properly controlled conditions, they yield an oxidized product of such a nature that it is readily permeable to the reducing atmospheres and to the ammonia-leaching liquors of the subsequent operations without having the disadvantages of hearth roasting. When the final iron oxide product is to be used for conventional iron and steel production, it is advisable, from an economic and technological viewpoint, to roast the concentrate to a sulfide-sulfur content below about 0.5%, preferably below about 0.25%. Minimizing the sulfide-sulfur content of the calcine to less than about 0.25%, is advantageous in that it decreases tendency for agglomeration during reduction, decreases undesirable formation of water-soluble sulfur compounds and ferric hydroxide in the leaching circuits and permits a higher degree of nickel extractability upon leaching. It is important to distinguish between sulfide sulfur, i. e., sulfur present as sulfide, and sulfate sulfur, i. e., sulfur present as sulfate, in the calcine, since the latter is in large part removed by volatilization in the subsequent reduction operation. It is essential that the roasted calcine particles be highly permeable to the reducing gases in the subsequent reduction operation and also be highly permeable to the ammoniacal leaching liquors, e. g., in the form of free, unagglomerated, porous particles, if the desired rate and degree of nickel recovery contemplated by the present invention are to be obtained. When employing the autogenous suspension-roasting method, the desired degrees of sulfur removal and permeability are obtained when the flame temperature is carefully controlled at a temperature in the range between about 1200° F. and about 1600° F., accomplished by careful control of the air-solid ratio in conjunction with control of such factors as oxygen concentration in the furnace atmosphere, proportion of exhaust gas recirculation, introduction of water into the furnace and furnace throughput rate. These temperatures are substantially lower than those normally encountered in flash-roasting of iron sulfides. The finely-divided pyrrhotite concentrate may be injected into the upper portion of a roasting chamber in concurrent flow with the entire oxygen-containing gas supply. For example, we have obtained satisfactory results when autogenously suspension roasting relatively coarse pyrrhotite flotation concentrate at a temperature of about 1425° F. by employing between 25% and 75% air in excess of that theoretically required to convert all of the iron sulfide to ferric oxide and sulfur dioxide, e. g., about 3 to about 4 pounds of air per pound of pyrrhotite. In order to obtain the desired quality of roasted product, it is important to consider not only flame temperature but also particle temperature. It has been known that control of particle size is a factor in determining maximum particle temperature in suspension-roasting operations. However, we have found that the proportion of excess air present also affects maximum particle temperature. It is important that oxygen concentration be taken into account when controlling operating temperaures in a given furnace by variation in the proportion of excess air employed. If the various operating factors in roasting of nickeliferous pyrrhotite are not judiciously controlled, the subsequent degree of nickel extractability can be deleteriously affected to a serious extent.

The advantage of relatively low-temperature roasting is illustrated by the following examples. Three identical portions of nickeliferous-pyrrhotite concentrate obtained by the foregoing concentration operations were roasted at temperature of about 1300° F., 1700° F. and 2100° F., respectively. The resulting calcines were reduced under identical conditions, i. e., 2½ hours at 1550° F. in an atmosphere containing a ratio of $CO_2+H_2O:CO+H_2$ of about 2.3:1. A sample of the reduced ore, in each of the three cases, was leached and aerated for varying periods of time in ammoniacal leaching solution containing about 6% ammonia and about 3% carbon dioxide, under conditions simulating commercial practice. The results are given in the following Table I:

Table I

| Maximum Roasting Temp., °F. | Sulfur in Leached Ore | Nickel Extracted | | |
|---|---|---|---|---|
| | | 1 Hour | 18 Hours | 48 Hours |
| | Per cent | Per cent | Per cent | Per cent |
| 1,300 | 0.02 | 74 | 86 | 89 |
| 1,700 | 0.01 | 47 | 69 | 81 |
| 2,100 | 0.01 | 41 | 58 | 72 |

From the foregoing data, it is seen that the rate of nickel extraction is more rapid and the degree of extraction reaches a higher ultimate level when the maximum roasting temperature is limited.

Suspension roasting at relatively low temperature prevents agglomeration, thereby promoting high permeability to subsequent reduction gases and ammoniacal leach solutions. Furthermore, low-temperature sulfur elimination produces a porous oxide in which the angular shape of the original sulfide particles is largely preserved, fusing of the particles while in suspension is prevented and intraparticle densification and crystal growth caused by undue particle temperature is deterred. In test operations, fine clean, pyrrhotite concentrate was injected with excess air into an autogenous suspension-roasting furnace, at constant flame temperatures of approximately 1400° F. and 1775° F., respectively, and at a feed rate of about one-half ton per day. Nickel extractability in the second of these operations was lowered, as shown in the following Table II, because of fusion of many particles and their transformation into hollow, relatively impermeable, spherical shells.

Table II

| Maximum Roasting Temp., °F. | Sulfur in Leached Ore | Nickel Extracted | |
|---|---|---|---|
| | | 18 Hours | 64 Hours |
| | Per cent | Per cent | Per cent |
| 1,400 | 0.02 | 80 | 87 |
| 1,775 | 0.01 | 67 | 76 |

A further advantage of controlled autogenous suspension roasting is that it more readily yields a concentrated sulfur dioxide gas than does hearth roasting, which gas is useful for many purposes, such as the manufacture of sulfuric acid or sulfur products. The gas produced is also at a higher temperature and can be used to better advantage for production of steam for power generation or for nickel recovery from the ammoniacal leach solutions.

The permeable oxide product from the controlled suspension-roasting operation is introduced, preferably hot for purposes of fuel economy, into a furnace. A suitable furnace for the purpose is one of the rotary-kiln type, such as descried in co-pending U. S. application Serial No. 2,838, filed January 17, 1948, U. S. Patent 2,507,123, and which can be modified, if desired, to permit concurrent flow of calcine and gas. Another type of furnace, suitable for carrying out the selective-reduction operation, is one of the fluid-bed type.

The selective-reduction operation in the present process is preferably carried out at temperatures between about 1400° F. and about 1600° F. The composition of the reducing atmosphere employed to effect the desired preferential reduction of the nickel in the calcine is controlled, in this temperature range, to obtain a ratio of $CO_2+H_2O:CO+H_2$ between about 1.5:1 and about 3:1. These ratios refer specifically to the composition of the exit gases with which the reduced calcine is in final contact. The selective-reduction time, within the foregoing temperature range and in atmospheres of the foregoing composition, is a most important factor and depends to a large extent upon the proportion of reducing components in the atmosphere, the degree of contact between the calcine and the reducing gases, i. e., the efficiency of gas-solid contact, and the degree of permeability of calcine particles. Thus, a reduction time from 10 minutes up to as long as 8 hours in the reducing atmosphere has been found to give the desired preferential reduction of the nickel component, the treatment time being dependent in each instance upon the nature and inter-relationship of the other foregoing important factors.

A combination of relatively strong reducing gas and high temperatures, sometimes even within specified ranges, must be avoided since under such conditions not only may excessive iron be reduced but the ore may agglomerate or form serious accretions within the reduction furnace. After reduction, the selectively-reduced material is cooled in a non-oxidizing atmosphere to less than about 400° F. Under proper conditions of reduction, less than about 5% of the iron present in this reduced material is soluble in ammoniacal leaching solutions. It has been found that treatment for iron solubility control, such as by the process disclosed in co-pending U. S. application Serial No. 778,558, filed October 8, 1947, U. S. Patent 2,478,942, and directed to the treatment of lateritic nickel ores, is normally not required. Other important differences in the natures of the problems involved in treating lateritic ores and nickeliferous pyrrhotite become apparent when comparing the disclosures of the co-pending application with present disclosures.

The effects of reduction temperature, gas composition and time upon rate and degree of nickel extraction in ammoniacal leach solutions is illustrated in following Table III. These representative data were selected from a series of reduction tests carried out on calcines produced from Sudbury-type ore by the mineral dressing procedures described hereinbefore and roasted at a temperature of about 1400° F. These calcines contained about 1% nickel and about 0.2% sulfide sulfur and had a particle size of about 90% finer than 200 mesh. The data in Table III demonstrates that 1000° F. is too low a reduction temperature in spite of the strongly reducing gas and prolonged reduction time employed, since only 75% nickel extractability was obtained and a high proportion of iron was concomitantly reduced. A reduction temperature of 1300° F. appears to be marginal under the test conditions employed, since a time sufficient to yield a nickel extractability of 84% also reduced an undesirably high proportion of the iron. A 2:1 ratio of $CO_2+H_2O$ to $CO+H_2$ was indicated to be too strong at 1600° F. when a reduction time of 2.5 hours was employed, since iron reduction was excessive although high nickel extractability was achieved. However, by adjusting the atmosphere to a 2.4:1 ratio and use of a reduction time of 2 hours, good results were obtained at 1600° F. At 1700° F. results were inferior, due to excessive iron reduction when the gas was sufficiently strong for acceptable nickel reduction. Furthermore, the rate of nickel solution was slow on material reduced at 1700° F. It will also be observed that when a relatively strongly reducing gas was employed, i. e., a gas having a ratio of 1.5:1, very rapid reduction was obtained. In this table, iron solubility is defined as the proportion of iron in the reduced ore soluble in an ammoniacal leach solution containing a sufficient quantity of ammonium citrate to prevent precipitation of such iron.

Table III

| Test No. | Reduction Temp., °F. | Ratio $CO_2+H_2O/CO+H_2$ | Time, Hrs. | Ni Extracted, 48 Hr. Leach | Fe Solubility |
|---|---|---|---|---|---|
| | | | | Per cent | Per cent |
| 1 | 1,000 | 1:1 | 10 | 75 | 22 |
| 2 | 1,300 | 2:1 | 5 | 84 | 6 |
| 3 | 1,400 | 1.5:1 | 0.33 | 90 | 6 |
| 4 | 1,400 | 1.5:1 | 0.66 | 89 | 10 |
| 5 | 1,550 | 2.3:1 | 2.5 | 89 | 2 |
| 6 | 1,600 | 3:1 | 2.5 | 83 | 2 |
| 7 | 1,600 | 2.4:1 | 2 | 88 | 2 |
| 8 | 1,600 | 2:1 | 1.25 | 82 | 4 |
| 9 | 1,600 | 2:1 | 2.5 | 89 | 12 |
| 10 | 1,600 | 1.5:1 | 0.2 | 89 | 6 |
| 11 | 1,700 | 3:1 | 2.5 | 81 | 5 |
| 12 | 1,700 | 2:1 | 2.5 | 85 | 18 |

In view of the foregoing, it will be understood that reduction operations can be carried out at temperatures and in atmospheres outside of the recommended ranges, but it is normally disadvantageous to do so. At temperatures much below 1400° F., the ratio of reducing to oxidizing components in the reducing gas required to obtain an economical amount and rate of nickel reduction must be so high as to reduce an undesirable proportion of the iron to a state soluble in ammoniacal leach solutions. Such soluble iron is detrimental in that it consumes fuel in the reduction operations and consumes oxygen during the leaching procedure. Furthermore, the resulting ferric hydroxide precipitate interferes with nickel recovery. At temperatures above about 1600° F., the portion of nickel in the reduced ore soluble in ammoniacal leach solution decreases due to recrystallization and increased particle density.

Ammonia leaching of the cooled, selectively-reduced calcine for production of commercially valuable iron oxide and for the recovery of over 80%, and in some cases even 90%, of the nickel as a commercial product can be carried out by methods known to the art.

It is well known in the art of ammonia leaching selectively-reduced, nickel-containing ores that a necessary feature of the leaching procedure is aeration of the ammoniacal pulp. In tests carried out over a period of years, we have found that use of concentrated oxygen instead of air results in substantially improved nickel recovery in a given leaching installation by virtue of a sharp increase in the rate of nickel solution. By employing oxygen, the rate of nickel extraction from the selectively-reduced ore by ammoniacal leaching solutions is increased about 6 to about 10 times over the rate of nickel extraction when employing a volume of air containing the same amount of oxygen. Other important advantages include the smaller volumes of gas used and recirculated, the smaller amount of gas requiring scrubbing for reagent recovery and smaller losses of reagents in vented gases. Thus, when using concentrated oxygen, ammoniacal leaching solutions can be employed containing proportions of ammonia and carbon dioxide higher than recommended in the prior art, for instance, up to about 10% and up to about 7% respectively.

Such higher reagent concentrations permit a nickel content in the pregnant solution substantially higher than that obtainable when employing the weaker, prior art solutions, which in turn means improved economy in recovery of nickel from said solution.

A typical final product containing about 95% iron oxide obtained by the foregoing novel process has the composition given in the following Table IV.

*Table IV*

| Constituent | Per cent |
| --- | --- |
| Iron | 68. |
| Nickel + Cobalt | 0.15 max. |
| Copper | 0.01. |
| Sulfur | 0.10 max. |
| Manganese | 0.01. |
| Phosphorus | 0.01. |
| Titania | 0.01. |
| Silica | 2.5. |
| Alumina | } 2.0 total. |
| Magnesia |  |
| Lime |  |

This finely-divided end-product can be agglomerated by methods known in the art of iron ore preparation, for conversion into sinter, pellets, nodules or briquettes eminently satisfactory for premium blast-furnace feed or open-hearth charge ore. The sulfur content of the iron oxide can readily be reduced to below 0.05% by the present process or during the course of subsequent agglomeration.

For the purpose of giving those skilled in the art a better understanding of the present invention, an example of the novel combination of operations illustrated by the flowsheet in the accompanying drawing is given hereinafter:

An ore rich in nickeliferous pyrrhotite 1 of the Sudbury type, containing about 2% pentlandite, about 20% pyrrhotite, about 3% chalcopyrite, about 0.02 ounce of platinum-group metals and gold per ton and the balance mainly gangue was comminuted in operation 2 to a particle size of about 15% plus 65 mesh. The comminuted ore was subjected to a two-stage froth flotation operation 3 using a potassium amyl xanthate collector in a lime circuit, a pine oil frother, and sodium silicate as a dispersing reagent, to recover therefrom a concentrate containing the bulk of the chalcopyrite, pentlandite and precious-metal minerals and a concentrate containing the bulk of the pyrrhotite while rejecting a gangue tailing. The pyrrhotite product from the aforementioned flotation treatment was then treated by magnetic separation operation 4. The magnetic pyrrhotite concentrate, containing about 1.25% nickel and about 0.25% copper, was then further comminuted at a rate of 20 tons per day, operation 5, to a particle size of about 90% minus 200 mesh. Finally, this ground, magnetic, pyrrhotite concentrate was given a final flotation, desliming and dewatering treatment, operation 6, using a potassium amyl xanthate collector in a lime circuit at about pH 11 to float substantially all of the remaining chalcopyrite, pentlandite and precious-metal minerals and to remove silica so as to leave a clean nickeliferous-pyrrhotite concentrate. The foregoing pyrrhotite concentrate was then dried, operation 8, to a moisture content of about 0.25%. Five tons per day of the dried pyrrhotite concentrate, containing about 3% silica, about 0.85% nickel, about 0.04% copper and about 0.005 ounce of platinum-group metals and gold per ton, were then autogenously suspension-roasted, operation 9, by injection with about 4 pounds of air per pound of pyrrhotite, into the top of one end of a suspension-roasting furnace. The rate of feed of said air-pyrrhotite mixture was controlled to yield a flame temperature of about 1425° F., the heat from the exothermic oxidation reaction being balanced by heat in the outgoing products and by heat dissipated through the furnace walls. The hot, sulfur dioxide-bearing roaster exhaust gases were suitable for steam raising and could be employed in a boiler as shown in operation 10. The resulting hot calcine, containing about 1% nickel, less than about 0.25% sulfide sulfur and the balance mainly iron oxide, was hot charged into a rotary kiln, such as described in co-pending U. S. application Serial No. 2,838, where it was selectively reduced, operation 11, at a maximum temperature of about 1500° F. in a controlled atmosphere obtained from a reducing oil flame and containing about 10–14% $H_2+CO$, about 20–28% $H_2O+CO_2$ and the balance mainly nitrogen. The length of time necessary to convert about 85% of the nickel in the calcine to the ammonia-soluble condition was determined by the interdependent factors of atmosphere composition, temperature and the permeability of the calcine particles to the reducing gases. The time of exposure of the calcine to the reducing atmosphere was adjusted to obtain the desired degree of preferential reduction of the nickel oxide component by controlling the feed rate and the speed of rotation of the kiln, modified by the action of the retaining rings and ore lifters. After treatment of the calcine in the aforementioned kiln under the preferred atmosphere and temperature conditions, the selectively-reduced product was cooled in a non-oxidizing atmosphere in the cooling zone of the aforementioned rotary kiln, to below about 300° F. In operation 12, samples of the aforementioned product were leached in an ammoniacal leaching solution containing about 8% ammonia and about 4% carbon dioxide. The leached pulp was oxygenated with commercial oxygen and subjected to solid-liquid separation. The liquid fraction so obtained was steam heated for recovery of a nickel product 13 containing about 85% of the nickel originally present in the pyrrhotite concentrate. The solid fraction so obtained consisted of a substantially sulfur-free, high-grade iron oxide product analyzing about 68% iron. It was found that the silica content of this product could be decreased to below 1% by magnetic separation and removal of the finest size fraction.

In the present specification, where nickel is mentioned, it is also meant to include any cobalt which may also be present. Suspension roasting is meant to include injection suspension, fluidized bed, or other means of gas suspension roasting.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for treating sulfide ore containing about 10% to about 35% nickeliferous pyrrhotite, about 1% to about 5% pentlandite, about 1% to about 5% chalcopyrite, less than about 0.05 ounce per ton of platinum-group metals and gold and the balance substantially siliceous gangue, for the recovery of a high-grade iron oxide product substantially free from nickel, copper, precious metals, sulfur and siliceous gangue, and a nickel-containing ammoniacal solution which comprises comminuting said ore to a particle size of about 15% plus 65 mesh, subjecting said comminuted ore to a froth-flotation operation using a xanthate collector in a lime circuit, a pine oil frother and sodium silicate as a dispersing agent to recover a concentrate containing most of the pentlandite, chalcopyrite and precious metals and a nickeliferous-pyrrhotite concentrate, treating said pyrrhotite concentrate by magnetic separation to obtain a magnetic nickeliferous-pyrrhotite concentrate containing about 1.5% nickel and about 0.25% copper, comminuting the magnetic nickeliferous pyrrhotite concentrate to about 90% minus 200 mesh, treating said comminuted magnetic concentrate to a desliming operation and a final froth-flotation operation using a xanthate collector at a pH of about 11 in a lime circuit to obtain a final nickeliferous-pyrrhotite concentrate substantially free from pentlandite and chalcopyrite, and containing about 0.85% nickel, about 0.04% copper, about 0.005 ounce of precious metals per ton and about 3% silica, drying said final concentrate to a free moisture content of less than about 0.5%, autogenously suspension roasting said final concentrate under controlled conditions at a temperature of about 1425° F. and using about 4 pounds of air per pound of final concentrate concurrently therewith to obtain an unagglomerated, permeable oxide containing about 1% nickel and less than about 0.25% sulfide sulfur and the balance substantially all iron oxide, treating said oxide in a controlled atmosphere containing about 10–14% $H_2+CO$, about 20–28% $H_2O+CO_2$ and the balance $N_2$ at a temperature of about 1500° F. to selectively reduce substantially all of the nickel to a condition soluble in ammoniacal leaching solution while maintaining the iron in a condition substantially all insoluble in said ammoniacal leaching solution, cooling the selectively-reduced oxide in a non-oxidizing atmosphere to below about 300° F., immersing and leaching the selectively-reduced oxide in aqueous ammoniacal solution containing about 8% ammonia and about 4% carbon dioxide while oxygenating with commercial oxygen, separating solution from solids in the pulp to obtain ammoniacal nickel-containing solution and containing at least about 35% of the nickel present in the nickeliferous-pyrrhotite concentrate and to obtain iron oxide substantially free from copper and sulfur and containing less than about 0.15% nickel and less than about 3% silica.

2. A process for treating sulfide ore containing up to about 65% nickeliferous pyrrhotite, up to about 10% pentlandite, up to about 10% chalcopyrite, precious-metals minerals, and the balance mainly siliceous gangue, for the recovery of a high-grade iron oxide product substantially free from nickel, copper, precious metals and sulfur, and a nickel-containing ammoniacal solution, which comprises comminuting said ore to a particle size whereby less than about 20% is plus 65 mesh; subjecting said comminuted ore to a stage froth-flotation operation using a strong collector in an alkaline circuit, a frothing agent and a dispersing reagent to recover therefrom a concentrate containing the bulk of the pentlandite, chalcopyrite, and precious-metals minerals, and a concentrate containing the bulk of the nickeliferous pyrrhotite; treating said pyrrhotite concentrate to a magnetic-separation operation to obtain a magnetic, nickeliferous-pyrrhotite concentrate; comminuting said magnetic concentrate to a particle size of at least about 75% minus 200 mesh; treating said magnetic concentrate to a final froth-flotation operation using a strong collector at a high pH in an alkaline circuit to obtain a final nickeliferous-pyrrhotite tailing substantially free from pentlandite, chalcopyrite, precious-metal minerals and siliceous gangue; desliming, dewatering, and drying said pyrrhotite to a free-moisture content of less than about 0.5% free moisture; autogenously suspension roasting said pyrrhotite concentrate under controlled conditions at a temperature of about 1400° F. and using about 3 to 4 pounds of air per pound of pyrrhotite concentrate to obtain a permeable, low sulfur nickeliferous iron oxide material; treating said material in the presence of a controlled atmosphere containing a ratio of $CO_2+H_2O:CO+H_2$ of about 1.5:1 to about 3:1 at a temperature between about 1400° F. and about 1600° F. to selectively reduce substantially all of the nickel contained in said material to a condition soluble in ammoniacal leaching solution while maintaining the iron contained in said material in a condition substantially all insoluble in said ammoniacal leaching solution; cooling the selectively-reduced oxide in a non-oxidizing atmosphere; immersing and leaching the selectively-reduced oxide in aqueous ammoniacal solution containing up to about 10% ammonia and up to about 7% carbon dioxide while oxygenating with concentrated oxygen to obtain a solution containing over about 85% of the nickel originally present in the pyrrhotite concentrate; separating said solution from solids in the pulp to obtain ammoniacal nickel-containing solution and to obtain a high-grade iron oxide residue substantially free from nickel, copper, precious metals, sulfur, and siliceous gangue.

3. A process for treating sulfide ore containing nickeliferous pyrrhotite, pentlandite, chalcopyrite, precious-metals minerals and siliceous gangue for the recovery of a high-grade iron oxide product substantially free from nickel, copper, precious metals and sulfur, and a nickel-containing ammoniacal solution substantially free from iron, copper and precious metals which comprises comminuting said ore to a particle size whereby less than about 20% is plus 65 mesh size; subjecting said comminuted ore to a froth-flotation operation to recover therefrom a concentrate containing the bulk of the pentlandite, chalcopyrite and precious-metals minerals, and a concentrate containing the bulk of the nickeliferous pyrrhotite; treating said pyrrhotite concentrate to a magnetic-separation operation to obtain a magnetic nickeliferous-pyrrhotite concentrate; comminuting said magnetic concentrate to a particle size whereby at least about 75% is minus 200 mesh; treating said magnetic concentrate to a final froth-flotation operation to obtain a final nickeliferous-pyrrhotite concentrate substantially free from pentlandite, chalcopyrite, precious-metals minerals and siliceous gangue; desliming and drying said final pyrrhotite concentrate; autogenously suspension roasting said pyrrhotite concentrate under controlled conditions at a temperature between about 1400° F. and 1500° F. and using about 3 to 4.5 pounds of air per pound of pyrrhotite to obtain an unagglomerated, nickel-bearing iron oxide product in a permeable condition; treating said oxide in the presence of a controlled atmosphere containing a ratio of $CO_2+H_2O:CO+H_2$ of about 1.5:1 to about 3:1 and at a temperature between about 1400° F. and about 1600° F. to selectively reduce substantially all of the nickel in said product to a condition soluble in ammoniacal leaching solution while maintaining the iron in said product in a condition substantially all insoluble in said ammoniacal leaching solution; cooling the selectively-reduced oxide in a non-oxidizing atmosphere; immersing and leaching the selectively-reduced oxide in aqueous solution containing ammonia and carbon dioxide; oxygenating the resulting pulp to obtain a solution containing over about 85% of the nickel present in the nickeliferous-pyrrhotite concentrate; separating solution from solids in the pulp to obtain ammoniacal nickel-containing solution and to obtain a high-grade iron oxide residue substantially free from nickel, copper, precious metals, sulfur and siliceous gangue.

4. A process for treating sulfide ore containing nickeliferous pyrrhotite, pentlandite, chalcopyrite, precious-metals minerals and siliceous gangue for the recovery of a high-grade iron oxide product substantially free from nickel, copper, precious metals and sulfur, and a nickel-containing ammoniacal solution which comprises comminuting said ore to less than about 20% plus 65 mesh particle size; subjecting said comminuted ore to froth-flotation to obtain a nickeliferous pyrrhotite concentrate; comminuting said concentrate to at least 75% minus 200 mesh particle size; treating said comminuted concentrate to final froth-flotation using a strong collector in a highly-alkaline circuit to obtain a final nickeliferous-pyrrhotite concentrate substantially free from pentlandite, chalcopyrite, precious metals and siliceous gangue; autogenously suspension roasting said pyrrhotite concentrate under controlled oxidizing conditions at a temperature above 1200° F. and below 1600° F. to obtain an unagglomerated, permeable, nickel-bearing, iron oxide product; selectively reducing said product in the presence of a controlled atmosphere containing a ratio of $CO_2+H_2O:CO+H_2$ of more than about 1.5:1 and less than about 3:1 and at a temperature above 1400° F. and not exceeding about 1600° F. to selectively reduce substantially all of the nickel in said product to a condition soluble in ammoniacal leaching solution while maintaining the iron in said product in a condition substantially all insoluble in said ammoniacal leaching solution; cooling the selectively-reduced product in a non-oxidizing atmosphere; immersing and leaching the selectively-reduced product in aqueous ammoniacal solution containing ammonia and carbon dioxide; treating the resulting pulp with a gas containing a substantial amount of free oxygen to obtain a solution containing at least about 85% of the nickel present in the nickeliferous pyrrhotite concentrate; and separating solution from solids in the pulp to obtain ammoniacal, nickel-containing solution and to obtain high-grade iron oxide substantially free from nickel, copper, precious metals, sulfur and siliceous gangue.

5. A process for treating sulfide ore containing nickeliferous pyrrhotite, pentlandite, chalcopyrite, precious-metals minerals and siliceous gangue for the recovery of a high-grade iron oxide product substantially free from nickel, copper, precious metals and sulfur, and a nickel-containing ammoniacal solution substantially free from iron, copper and precious metals which comprises comminuting said ore to less than about 20% plus 65 mesh particle size; subjecting said comminuted ore to froth-flotation to recover therefrom a concentrate containing the bulk of the nickeliferous pyrrhotite; comminuting said concentrate to at least 75% minus 200 mesh particle size; treating said concentrate to a final froth-flotation operation using a strong collector in a highly-alkaline circuit to obtain a final nickeliferous-pyrrhotite concentrate substantially free from pentlandite, chalcopyrite, precious metals minerals and siliceous gangue; autogenously suspension roasting said pyrrhotite concentrate under controlled oxidizing conditions at a temperature between about 1300° F. and about 1500° F. to obtain an unagglomerated, nickel-bearing iron oxide product in a permeable condition; treating said oxide in the presence of a controlled reducing atmosphere containing a ratio of $CO_2+H_2O:CO+H_2$ of more than about 1.5:1 and less than about 3:1 and at a temperature above 1400° F. and not exceeding about 1600° F. to selectively reduce substantially all of the nickel in said product to a condition soluble in ammoniacal leaching solution while maintaining the iron in said product in a condition substantially all insoluble in said ammoniacal leaching solution; cooling the selectively-reduced oxide in a non-oxidizing atmosphere; immersing and leaching the selectively-reduced oxide in aqueous ammoniacal solution; and treating the resulting pulp with a gas containing a substantial amount of free oxygen to obtain a solution containing the bulk of the nickel present in the nickeliferous-pyrrhotite concentrate and to obtain a high-grade iron oxide residue substantially free from nickel, copper, precious metals, sulfur and siliceous gangue.

6. A process for treating sulfide ore containing nickeliferous pyrrhotite and other sulfide minerals containing a metal from the group consisting of copper and nickel for the recovery of a high-grade iron oxide product substantially free from nickel, copper and sulfur which comprises comminuting said ore to less than about 20% plus 65 mesh particles size; subjecting said comminuted are to froth-flotation to recover therefrom a nickeliferous-pyrrhotite concentrate from the bulk of the other sulfide minerals; comminuting said concentrate to at least 75% minus 200 mesh particle size; treating said concentrate to a final froth-flotation operation using a strong collector in a highly-alkaline circuit to separate the nickeliferous-pyrrhotite product from substantially all the remaining other sulfide minerals; autogenously suspension roasting said pyrrhotite product under controlled oxidizing conditions at a temperature above about 1300° F. and below about 1500° F. to obtain an unagglomerated, permeable, nickeliferous iron oxide material; selectively reducing said material in the presence of a controlled atmosphere containing a ratio of $CO_2+H_2O:CO+H_2$ of more than about 1.5:1 and less than about 3:1 at a temperature above 1400° F. and not exceeding about 1600° F. to selectively reduce substantially all of the nickel contained in said material to a condition soluble in ammoniacal leaching solution while maintaining the iron contained in said material in a condition substantially all insoluble in said ammoniacal leaching solution; cooling the selectively-reduced oxide in a non-oxidizing atmosphere; immersing the selectively-reduced oxide in aqueous ammoniacal solution to form ammoniacal pulp; leaching said pulp in said ammoniacal solution; and treating said pulp with a gas containing a substantial amount of free oxygen to obtain a solution containing the bulk of the nickel originally present in the pyrrhotite product and to obtain a high-grade iron oxide residue substantially free from nickel, copper and sulfur.

7. A process for treating sulfide ore containing nickeliferous pyrrhotite, pentlandite, chalcopyrite, precious-metals minerals and siliceous gangue for the recovery of a high-grade iron oxide product substantially free from nickel, copper, precious metals and sulfur, and a nickel-containing ammoniacal solution substantially free from iron, copper and precious metals which comprises comminuting said ore to a fine particle size; subjecting said comminuted ore to a magnetic-separation operation to obtain a magnetic nickeliferous pyrrhotite concentrate; comminuting said concentrate to at least 75% minus 200 mesh particle size; subjecting said concentrate to froth-flotation to obtain a final nickeliferous-pyrrhotite concentrate substantially free from pentlandite, chalcopyrite, precious-metals minerals and siliceous gangue; autogenously suspension roasting said pyrrhotite concentrate under controlled oxidizing conditions at a temperature between about 1300° F. and about 1500° F. to obtain an unagglomerated, nickel-bearing iron oxide product in a permeable condition; treating said oxide in the presence of a controlled reducing atmosphere containing a ratio of

$$CO_2+H_2O:CO+H_2$$

of more than about 1.5:1 and less than about 3:1 and at a temperature above 1400° F. and not exceeding about 1600° F. to selectively reduce substantially all of the nickel in said product to a condition soluble in ammoniacal leaching solution while maintaining the iron in said product in a condition substantially all insoluble in said ammoniacal leaching solution; cooling the selectively-reduced oxide in a non-oxidizing atmosphere; immersing and leaching the selectively-reduced oxide in aqueous ammoniacal solution; and treating the resulting pulp with a gas containing a substantial amount of free oxygen to obtain a solution containing the bulk of the nickel present in the nickeliferous-pyrrhotite concentrate and to obtain a high-grade iron oxide residue substantially free from nickel, copper, precious metals, sulfur and siliceous gangue.

8. A process for treating sulfide ore containing nickeliferous pyrrhotite, pentlandite, chalcopyrite, precious-metals minerals and siliceous gangue for the recovery of a high-grade iron oxide product substantially free from nickel, copper, precious metals and sulfur, and a nickel-containing ammoniacal solution substantially free from iron, copper and precious metals which comprises comminuting said ore to less than about 20% plus 65 mesh particle size; subjecting said comminuted ore to froth-flotation to recover therefrom a concentrate containing the bulk of the nickeliferous pyrrhotite; comminuting said concentrate to at least about 75% minus 200 mesh particle size; subjecting said concentrate to a magnetic-separation operation to obtain a final magnetic nickeliferous-pyrrhotite concentrate substantially free from pentlandite, chalcopyrite, precious-metals minerals and siliceous gangue; autogenously suspension roasting said pyrrhotite concentrate under controlled oxidizing conditions at a temperature between about 1300° F. and about 1500° F. to obtain an unagglomerated, nickel-bearing iron oxide product in a permeable condition; treating said oxide in the presence of a controlled reducing atmosphere containing a ratio of $CO_2+H_2O:CO+H_2$ of more than about 1.5:1 and less than about 3:1 and at a temperature above 1400° F. and not exceeding about 1600° F. to selectively reduce substantially all of the nickel in said product to a condition soluble in ammoniacal leaching solution while maintaining the iron in said product in a condition substantially all insoluble in said ammoniacal leaching solution; cooling the selectively-reduced oxide in a non-oxidizing atmosphere; immersing and leaching the selectively-reduced oxide in aqueous ammoniacal solution; and treating the resulting pulp with a gas containing a substantial amount of free oxygen to obtain a solution containing the bulk of the nickel present in the nickeliferous-pyrrhotite concentrate and to obtain a high-grade iron oxide residue substantially free from nickel, copper, precious metals, sulfur and siliceous gangue.

9. A process for treating sulfide ore containing nickeliferous pyrrhotite, pentlandite, chalcopyrite, precious-metals minerals and siliceous gangue for the recovery of a high-grade iron oxide product substantially free from nickel, copper, precious metals and sulfur, and a nickel-containing ammoniacal solution substantially free from iron, copper and precious metals which comprises comminuting said ore to at least about 90% minus 200 mesh particles size; subjecting said comminuted ore to froth-flotation and magnetic-separation operations to recover therefrom a magnetic nickeliferous-pyrrhotite concentrate substantially free from pentlandite, chalcopyrite, precious-metals minerals and siliceous gangue; autogenously suspension roasting said pyrrhotite concentrate under controlled oxidizing conditions at a temperature above 1200° F. and below 1600° F. to obtain an unagglomerated, nickel-bearing iron oxide product in a permeable condition; treating said oxide in the presence of a controlled reducing atmosphere containing a ratio of

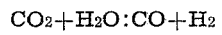

$$CO_2+H_2O:CO+H_2$$

of more than about 1.5:1 and less than about 3:1 and at a temperature above 1400° F. and not exceeding about 1600° F. to selectively reduce substantially all of the nickel in said product to a condition soluble in ammoniacal leaching solution while maintaining the iron in said product in a condition substantially all insoluble in said ammoniacal leaching solution; cooling the selectively-reduced oxide in a non-oxidizing atmosphere; immersing and leaching the selectively-reduced oxide in aqueous ammoniacal solution; and treating the resulting pulp with a gas containing a substantial amount of free oxygen to obtain a solution containing the bulk of the nickel present in the nickeliferous-pyrrhotite concentrate and to obtain a high-grade iron oxide residue substantially free from nickel, copper, precious metals, sulfur and siliceous gangue.

PAUL ETIENNE QUENEAU.
WILLIAM KELVIN SPROULE.
ALEXANDER ILLIS.

REFERENCES CITED

The following references are of record in the file of this patent:

UNITED STATES PATENTS

| Number | Name | Date |
|---|---|---|
| 1,939,119 | Holt et al. | Dec. 12, 1933 |
| 2,195,724 | Gaudin et al. | Apr. 2, 1940 |
| 2,296,522 | Hartley | Sept. 22, 1942 |
| 2,363,315 | Grothe | Nov. 21, 1944 |
| 2,364,777 | Brown et al. | Dec. 12, 1944 |
| 2,400,098 | Brogdon | May 14, 1946 |
| 2,400,115 | Hills et al. | May 14, 1946 |
| 2,473,795 | Hills et al. | June 21, 1949 |
| 2,478,942 | Queneau et al. | Aug. 16, 1949 |